Patented Sept. 21, 1954

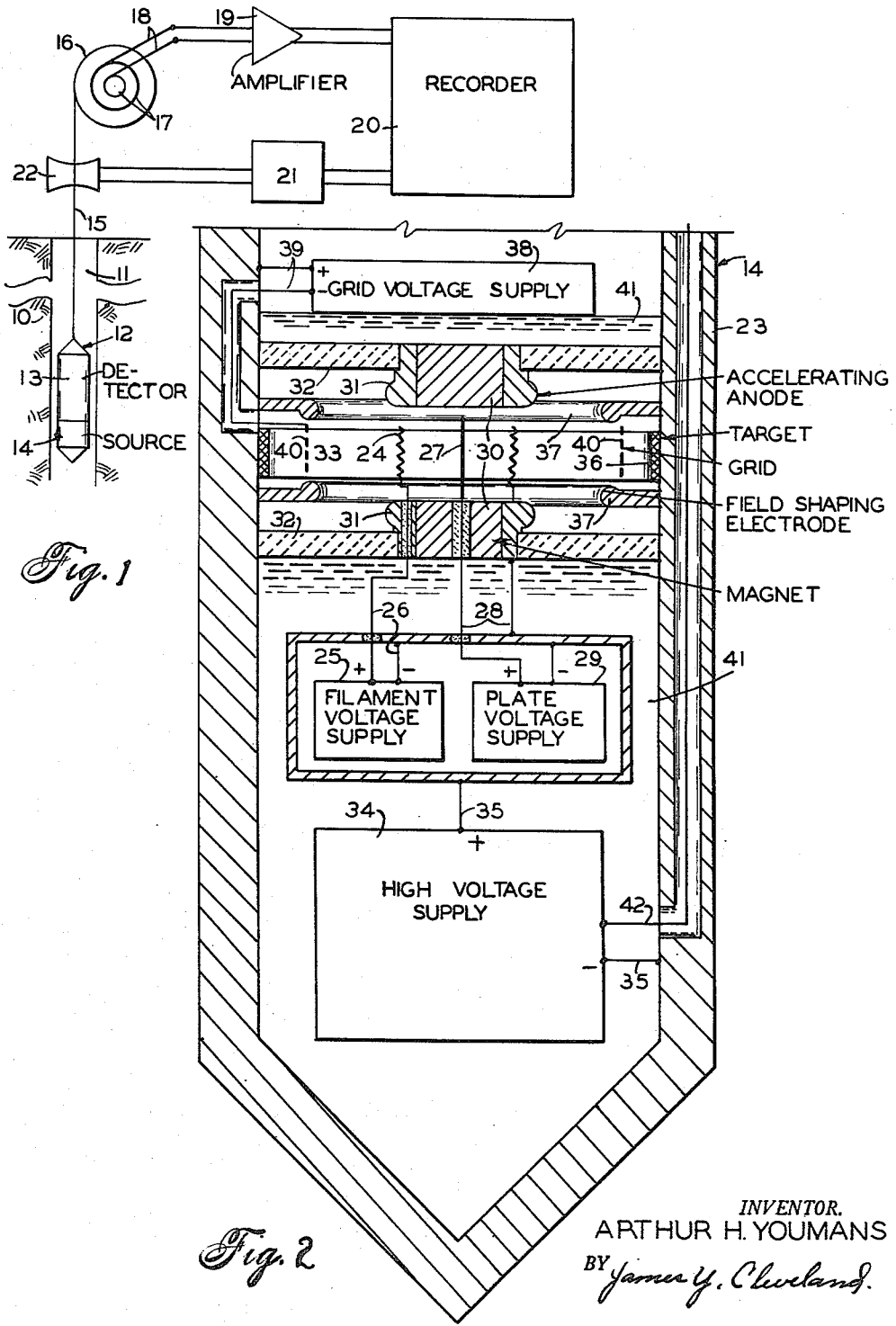

2,689,918

UNITED STATES PATENT OFFICE 2,689,918

STATIC ATMOSPHERE ION ACCELERATOR
FOR WELL LOGGING

Arthur H. Youmans, Tulsa, Okla., assignor to Well Surveys, Incorporated, Tulsa, Okla., a corporation of Delaware Application April 26, 1952, Serial No. 284,614

20 Claims. (Cl. 250—84)

This invention relates to the art of geophysical prospecting and more particularly to the art of radioactivity well logging wherein subsurface strata are bombarded with neutrons released by the bombardment of tritium with high energy deuterons.

In radioactivity well logging it is conventional to bombard the formations of the earth surrounding a well with neutrons and to record as a function of depth the neutrons scattered by the formations or gamma rays produced in the formations by the bombarding neutrons. The conventional source of neutrons used in well logging is a mixture of radium and beryllium. Although use of such a source permits satisfactory logging, better logs could be made were the characteristics of the source different. The large number of gamma rays emitted by a radium-beryllium source produces a large gamma-ray background radiation which may obscure the gamma rays produced by the neutrons in the formations; a source which emits few or no gamma rays is desirable. The intensity of the radiation from a conventional source is about as high as is economically permissible and it is as high as safety requirements will permit, also a source of neutrons higher in energy than those from a conventional source would permit neutrons to travel farther from the source than do those from a conventional source, and the higher energy neutrons would excite excitation levels that cannot be excited by neutrons from a conventional source. For making a spectral analysis of neutrons returning from the formations it is desirable that the irradiating neutrons be nearly mono-energetic which is not so in the case of the conventional source. There are some measurements which can only be made if the source can be pulsed or turned off at will; a neutron source that can be turned off may be used safely for a higher intensity bombardment than weaker sources, since the source can be turned off when on the surface and can be turned on when down the well.

This invention makes use of the deuterium-tritium reaction to produce high energy neutrons. A deuterium atom and a tritium atom react to produce an alpha particle and a neutron of approximately 14 mev. energy. Deuterium and tritium can be made to react by bombarding atoms of one with atoms of the other. The kinetic energy of the bombarding atom together with the 17.6 mev. reaction energy is divided between the resulting neutron and alpha particle. In this invention deuterium ions are accelerated against a tritium target. The reaction cross-section depends upon the energy given the deuterium ions with the most favorable energy being approximately 100 kev. Such a deuterium-tritium reactor avoids the above mentioned difficulties encountered with the conventional radium-beryllium source of neutrons. There are no gamma rays produced by the deuterium-tritium reaction, although, of course, gamma rays may be produced by other unavoidable reactions in the reactor since deuterium and tritium are not the only materials present. At least the principal reaction is gamma-rayless. The intensity of the radiation may be made much larger than that from conventional sources for it is limited only by the current capacity of the reactor. Safety is no problem for the reactor may be turned off by turning off the accelerating voltage, whenever it is necessary for personnel to approach the reactor. The 14 mev. neutrons from the deuterium-tritium reactors are several times as energetic as the average neutrons from the conventional source. The neutrons from the deuterium-tritium reactor are very nearly mono-energetic varying only to the extent of 0.5 mev. due to the ballistics of the reaction. The deuterium-tritium reactor can be pulsed and turned off at will by turning off the voltage which is used to accelerate or to produce the bombarding ions.

Prior art deuterium-tritium reactors are inadequate for use in a bore hole. The principal drawback of prior art reactors is that they require continuous evacuation of the space in which the ions are accelerated in order that the high speed ions not suffer collisions in this space. Vacuum pumps are unsuited for the limited space available in any well logging instrument. The constant evacuation of prior art deuterium-tritium reactors is necessary because ions must be produced in a relatively dense atmosphere and the ions and some gas pass into the evacuated space where the ions are accelerated. In this invention it is proposed to use a static atmosphere ion accelerator. The ion source and the accelerator are at the same pressure and pumps are therefore not necessary to maintain a pressure differential. In order that ionization not take place in the accelerating part of the reactor, low pressure is necessary. In order that ionization can take place in the ion source part of the reactor at such low pressure, electrons are caused to travel long distances in this part of the reactor without striking an electrode or a wire and losing energy before striking and ionizing a deuterium atom. Such may be accomplished by providing a magnetic field which causes an electron to travel along a curved path until it strikes an atom and ionizes it; the electron cannot pass directly to the electrode to which it is attracted.

Therefore, the primary object of this invention is to provide a method and apparatus for irradiating the formations surrounding a well with high energy neutrons. Another object is to make a source of high energy neutrons which is substantially free of gamma rays. Another object is to provide a source of substantially monoenergetic neutrons. Still another object is to provide a source of neutrons that can be pulsed or turned off at will. Still another object is to make a deuterium-tritium reactor for use in a bore hole for radioactivity well logging. Other objects and advantages of the present invention will become apparent from the following detailed description when considered with the accompanying drawings, in which:

Figure 1 is a diagrammatic illustration of a radioactivity well logging operation;

Figure 2 is a vertical sectional view of one form of the neutron source shown in Figure 1.

Figure 3:
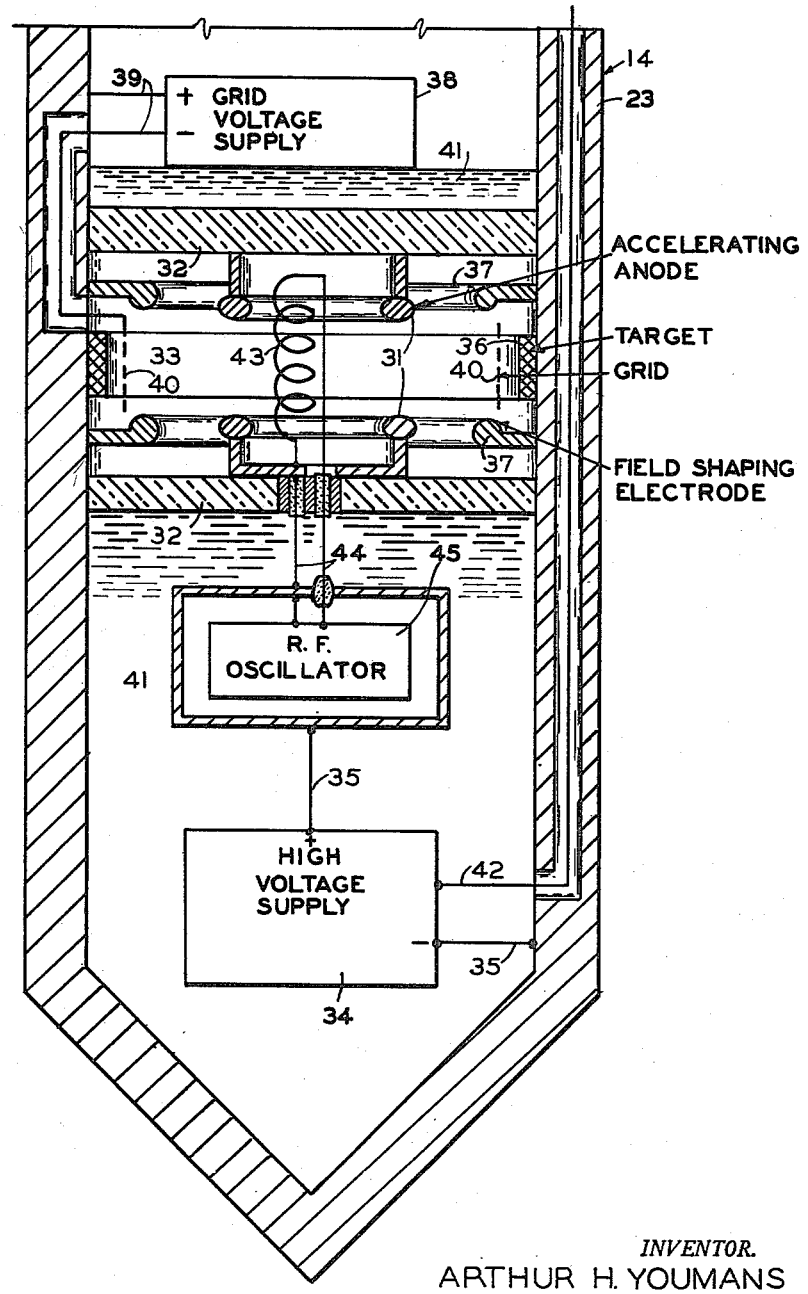
Figure 3 is a vertical sectional view of a modified form of the neutron source shown in Figure 1.

Referring to the drawings in detail, particularly Figure 1, there is illustrated schematically a radioactivity well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detector 13 and a neutron source 14. Cable 15 suspends the instrument in the well and contains the required conductors for electrically connecting the instrument with the surface apparatus. The cable is wound on or unwound from drum 16 in raising and lowering the instrument 12 to traverse the well.

In making a radioactivity log of a well, instrument 12 is caused to traverse the well. Thereby neutrons from source 14 irradiate the formations surrounding the bore hole and radiations influenced by the formations are detected by detector 13. The resultant signal is sent to the surface through cable 15. Through slip rings 17 and brushes 18 on the end of the drum, the signal may be conducted to amplifier 19 for amplification. The amplified signal is conducted to recorder 20 and recorded. Recorder 20 is driven through a transmission 21 by measuring reel 22 over which cable 15 is drawn so that recorder 20 moves in correlation with depth as instrument 12 traverses the well. The elements are shown diagrammatically, and it is to be understood that the associated circuits and power supplies are provided in a conventional manner. Amplifier 19 may be included in the subsurface instrument, or amplification may be effected both on the surface and in the subsurface instrument. It is also to be understood that the instrument housing will be constructed to withstand the pressures and mechanical and thermal abuses encountered in logging a deep well and provide adequate space within it to house the necessary apparatus and permit the transmission of radiation through it.

In Figure 2 is illustrated one form of the source 14 comprising a deuterium-tritium reactor and associated circuits within housing 23. Filament 24 is heated by current from filament battery 25 conducted through conductors 26. The heated filament frees electrons which are accelerated toward plate 27 by a voltage applied through conductors 28 by plate voltage supply 29. These electrons are constrained to move in circular paths by a magnetic field produced by magnets 30, which may be Alnico. Magnets 30 may be mounted in accelerating anodes 31 which are suspended from the instrument housing by insulators 32. Within the chamber 33 defined by housing 23, insulators 32, anodes 31 and magnets 30 is confined deuterium gas at a very low pressure, which may be of the order of $10^{-4}$ mm. Hg ($10^{-5}$ to $10^{-3}$ mm. Hg). Electrons from filament 24 do not go directly to electrode 27 but travel in curved paths until they strike something, which often may be atoms or deuterium. The path of the electron to the electrode 27 may be lengthened by making electrode 27 very small and by shaping it so that the electric field is not straight from filament 24 to electrode 27; then electrons would very likely not strike electrode 27 until after a number of times missing it. When electrons strike deuterium atoms, the atoms may be ionized. The resultant positive ions are drawn toward the filament by the voltage applied between filament 24 and plate 27 by plate voltage supply 29 which may be of the order of 100 volts (50 to 500 volts). Many of these ions will not strike the filament but will pass by the filament into a region of chamber 33 where they may be accelerated by a high voltage applied from high voltage supply 34 through conductors 35 and housing 23 between anodes 31 and target 36 which contains tritium. As is well known in the art, the target may conveniently be made of zirconium which has been caused to adsorb a large quantity of tritium. The target may be cylindrical and disposed on the inner wall of housing 23. Use of a broad target rather than a spot permits diffusion of ions with consequent diffusion of heating of the target. The target will therefore not become overheated so readily as when a beam of ions is used. Field shaping electrodes 37 shape the field so that the deuterium ions are accelerated toward the target and not toward other parts of the walls of the chamber. By grid voltage supply 38 connected through conductors 39, grid 40 is maintained at a relatively small negative potential with respect to the target 36, to suppress secondary electrons emitted from the target which might otherwise be accelerated back to anodes 31 thereby causing undesirable energy dissipation.

High voltage supply 34 is insulated by insulation 41. This high voltage supply is grounded to the housing 23 at the negative terminal and a voltage of the order of 100,000 volts (50,000 to 200,000 volts) should be developed at the positive terminal. Filament battery 25, plate battery 29, magnets 30, and anodes 31 must also be well insulated by insulation 41 from the housing 23 because they operate at the high potential.

When high energy deuterium ions strike the target, some of these ions will react with tritium atoms. The reaction cross-section depends upon the kinetic energy of the deuteron; the optimum energy is of the order of 100 kev., but the cross-section is appreciable at 50 kev. Of course for a thick target, the higher the energy the greater the volume of the target exposed and hence the greater the portion of impinging ions reacting. The reaction between deuterium and tritium produces alpha particles and neutrons. The energy of the neutrons produced is 14 mev., except to the extent that the bombarding ions give up their kinetic energy to the neutrons. This neutron flux is used to irradiate the formations surrounding a bore hole, as described in connection with Figure 1.

The principal reaction desired is that produced by the acceleration of deuterium ions on tritium. However, other elements are present and other reactions may occur. In particular the gas will contain tritium, and the target will contain deuterium. This is because the zirconium does not hold the tritium perfectly, and some escapes into the gas; and the zirconium will adsorb some deuterium from the gas. Tritium ions will therefore be accelerated to strike deuterium. This will release the same energy as the converse reaction, 14 mev., but this reaction is less efficient, since more voltage is required to accelerate the larger particle to the same velocity. The reaction of tritium ions striking tritium is not efficient but the reaction of deuterium ions striking deuterium may produce some 2.5 mev. neutrons. No neutrons are produced by the accelerated ions which strike zirconium.

The neutron flux can be turned on and off or pulsed by turning on and off or pulsing the high voltage supply 34. This could be accomplished by operating a relay or switch within the high voltage supply from the surface through conductor 42. If power is supplied to high voltage supply 34 through conductor 42 from the surface, this power may be turned on and off or pulsed to turn on and off or pulse the neutron flux.

Although filament voltage supply 25, plate voltage supply 29, and grid voltage supply 38 are shown to have their power self-contained and hence may be batteries, they may alternatively receive power from the surface through cable 15. In such a case isolation of the filament and plate supplies must be effected to operate at a high potential. Isolating transformers or a motor-generator unit with an insulating drive shaft or belt might be used. In such a case, pulsing might be effected by pulsing the plate voltage supply 29. To increase the effectiveness and speed of pulsing, the plate supply may be caused to reverse polarity so that ions formed between the plate and the filament are drawn toward the plate when the source is off. The pulsing may be effected from the surface through cable 15 or may be by a local oscillator.

In Figure 3 is illustrated another form of neutron source 14. In this case the ionization is produced by electrons set in motion by a radio frequency field produced by radio frequency coil 43 which is supplied with radio frequency voltage through conductors 44 from radio frequency oscillator 45. The radio frequency field causes free electrons present to oscillate. Energy is not lost by striking wires or electrodes, and evenually the electrons will strike atoms and ionize them, thereby producing more electrons which will oscillate. Deuterium ions may drift through the coil 43 and be accelerated as described in connection with Figure 2.

In order to improve the outward diffusion of ions from th radio frequency coil, it may be desirable to make the radio frequency coil slightly positive with respect to electrodes 31, as by a battery.

Although radio frequency oscillator 45 is shown to have its power self-contained, it is possible to supply power from the surface through cable 15 as were the power supplies as described above. Pulsing may then be effected by pulsing the radio frequency oscillator, either from the surface or from a local oscillator.

It is to be understood that this invention is not to be limited to the specific modifications described but is to be limited only by the scope of the following claims, in which I claim:

1. In radioactivity well logging, a method of bombarding the formations surrounding a drill hole with neutrons that comprises confining deuterium gas under static pressure, ionizing said confined deuterium gas, and accelerating the resultant deuterium ions by an electric field against a tritium target.

2. In radioactivity well logging, a method of bombarding the formation surrounding a drill hole with neutrons that comprises confining deuterium gas under static pressure, accelerating electrons, ionizing said confined deuterium gas with said accelerated electrons, and accelerating the resultant deuterium ions by an electric field against a tritium target, whereby neutrons of 14 mev. energy are produced.

3. In radioactivity well logging, a method of bombarding the formations surrounding a drill hole with neutrons that comprises confining deuterium gas under static pressure, accelerating electrons by a first electric field in said confined deuterium gas, causing said electrons to remain in said confined deuterium gas until striking deuterium atoms whereby said deuterium atoms become ionized, and accelerating the resultant deuterium ions by a second electric field against a tritium target whereby neutrons of 14 mev. energy are produced.

4. In radioactivity well logging, a method of bombarding the formations surrounding a drill hole with neutrons that comprises heating a filament with an electric current thereby causing said filament to emit electrons in a region filled with deuterium gas at a static low pressure, accelerating said electrons toward a positive electrode by a voltage between said filament and said positive electrode, applying a magnetic field in the region between said filament and said positive electrode whereby said electrons do not reach said positive anode but travel in curved paths until they strike atoms of said deuterium gas, and accelerating the deuterium ions produced by said striking by an electric field against a tritium target whereby neutrons of 14 mev. energy are produced.

5. In radioactivity well logging, a method of bombarding the formations surrounding a drill hole with neutrons that comprises applying a radio frequency electric field to a region containing deuterium gas at a static low pressure whereby electrons present are caused to oscillate until they strike deuterium atoms, and accelerating the deuterium ions produced by said striking by an electric field against a tritium target whereby neutrons of 14 mev. energy are produced.

6. In radioactivity well logging, a method of bombarding the formations surrounding a drill hole with neutrons that comprises confining deuterium gas under static pressure, accelerating electrons by a first electric field in said confined deuterium gas, ionizing said confined deuterium gas with said accelerated electrons, accelerating the resultant deuterium ions by a second electric field against a tritium target whereby neutrons of 14 mev. energy are produced, and pulsing said first electric field whereby the production of neutrons is pulsed.

7. In radioactivity well logging, a method of bombarding the formations surrounding a drill hole with neutrons that comprises confining deuterium gas under static pressure, accelerating electrons with a first electric field in said confined deuterium gas; ionizing said confined deuterium gas with said accelerated electrons, accelerating the resultant deuterium ions with a second electric field against a tritium target whereby neutrons of 14 mev. energy are produced, and suppressing secondary electrons emitted from said target.

8. A source of neutrons for radioactivity well logging that comprises a housing, deuterium gas confined within said housing under static pressure, means for ionizing said deuterium gas, and electrical means for accelerating deuterium ions so produced against a tritium target.

9. A source of neutrons for radioactivity well logging that comprises a housing, deuterium gas at a static low pressure, means for accelerating electrons within said deuterium gas to ionize said deuterium gas, and electrical means for accelerating the resultant deuterium ions against a tritium target to produce 14 mev. neutrons.

10. A source of neutrons for radioactivity well logging that comprises a housing, deuterium gas at a static low pressure, means for accelerating electrons within said deuterium gas to ionize said deuterium gas, means for keeping said electrons in said deuterium gas until said electrons strike atoms of said deuterium gas, and electrical means for accelerating the resultant deuterium ions against a tritium target to produce 14 mev. neutrons.

11. A source of neutrons for radioactivity well logging that comprises a housing containing deuterium gas at low pressure, a central electrode within said housing, a filament also within said housing disposed about said central electrode, means for heating said filament to emit electrons, a first voltage source connected between said central electrode and said filament to accelerate said electrons toward said central electrode and ionize said deuterium gas, at least one magnet arranged to produce a magnetic field in the region between said central electrode and said filament transverse to the electric field produced by said first voltage source, an accelerating anode also within said housing disposed outside said region, a tritium target disposed about said accelerating anode, and a second voltage source connected between said accelerating anode and said target to accelerate ions produced in said region so said ions may strike said target to produce 14 mev. neutrons.

12. A source of neutrons for radioactivity well logging that comprises a housing containing deuterium gas at a low pressure of the order of $10^{-4}$ mm. Hg, a central electrode within said housing, a filament also within said housing disposed about said central electrode, electrical means for heating said filament to emit electrons, a first voltage source of the order of 100 volts connected between said central electrode and said filament to accelerate said electrons toward said central electrode to sufficient energy to ionize said deuterium gas, at least one magnet arranged to produce a magnetic field in the region between said central electrode and said filament transverse to the electric field produced by said first voltage source, an accelerating anode also within said housing disposed outside said region, a tritium target disposed on the inner wall of said housing, and a second voltage source of the order of 100,000 volts connected between said accelerating anode and said target to accelerate ions produced in said region to sufficient energy to cause them to strike tritium nuclei in said target producing 14 mev. neutrons.

13. A source of neutrons for radioactivity well logging that comprises a housing containing deuterium gas at a pressure of $10^{-5}$ to $10^{-3}$ mm. Hg, a central electrode within said housing, a filament also within said housing disposed about said central electrode, electrical means for heating said filament to emit electrons, a first voltage source of 50 to 500 volts connected between said central electrode and said filament to accelerate said electrons toward said central electrode to sufficient energy to ionize said deuterium gas, at least one magnet arranged to produce a magnetic field in the region between said central electrode and said filament transverse to the electric field produced by said first voltage source, an accelerating anode also within said housing disposed outside said region, a tritium target disposed on the inner wall of said housing, and a second voltage source of 50,000 to 200,000 volts connected between said accelerating anode and said target to accelerate ions produced in said region to sufficient energy to cause them to strike tritium nuclei in said target producing 14 mev. neutrons.

14. A source of neutrons for radioactivity well logging that comprises a housing containing deuterium gas at low pressure, a coil, a radio frequency voltage source connected to said coil to accelerate electrons to sufficient energy to ionize said deuterium gas, an accelerating anode disposed within said housing, a tritium target also disposed within said housing, and a high voltage source connected between said accelerating anode and said target to accelerate ions so produced so said ions may strike said target to produce 14 mev. neutrons.

15. A source of neutrons for radioactivity well logging that comprises a housing containing deuterium gas at a pressure of $10^{-5}$ to $10^{-3}$ mm. Hg, a coil, a radio frequency voltage source connected to said coil to accelerate electrons to sufficient energy to ionize said deuterium gas, an accelerating anode disposed within said housing, a tritium target also disposed within said housing, and a high voltage source of 50,000 to 200,000 volts connected between said accelerating anode and said target to accelerate ions so produced so said ions may strike said target to produce 14 mev. neutrons.

16. A source of neutrons for radioactivity well logging that comprises a housing containing deuterium gas at low pressure, means for accelerating electrons within said deuterium gas to ionize said deuterium gas, high voltage means for accelerating the resultant deuterium ions against a tritium target to produce 14 mev. neutrons, means connecting said high voltage means to the surface of the earth, and means at the surface for turning off and on said high voltage means.

17. A source of neutrons for radioactivity well logging that comprises a housing containing deuterium gas at low pressure, a central electrode within said housing, a filament also within said housing disposed about said central electrode, means for heating said filament to emit electrons, a first voltage source connected between said central electrode and said filament to accelerate said electrons toward said central electrode and ionize said deuterium gas, at least one magnet arranged to produce a magnetic field in the region between said central electrode and said filament transverse to the electric field produced by said first voltage source, an accelerating anode also within said housing disposed outside said region, a tritium target also disposed within said housing, a second voltage source connected between said accelerating anode and said target to accelerate ions produced in said region so said ions may strike said target to produce 14 mev. neutrons, and means to pulse said first voltage source.

18. A source of neutrons for radioactivity well logging that comprises a housing containing deuterium gas at low pressure, a coil, a radio frequency voltage source connected to said coil to accelerate electrons to sufficient energy to ionize said deuterium gas, an accelerating anode disposed within said housing, a tritium target also disposed within said housing, a high voltage source connected between said accelerating anode and said target to accelerate ions so produced so said ions may strike said target to produce 14 mev. neutrons, and means to pulse said radio frequency source.

19. A source of neutrons for radioactivity well logging that comprises a housing containing deuterium gas at low pressure, means for accelerating electrons within said deuterium gas to ionize said deuterium gas in the central region of said housing, an accelerating anode also within said housing disposed outside said region, a tritium target disposed about said accelerating anode, a voltage source connected between said accelerating anode and said target to accelerate ions produced in said region so said ions may strike said target to produce 14 mev. neutrons, a grid disposed near said target between said accelerating anode and said target, and a second voltage source connected between said grid and said target with said grid negative with respect to said target to suppress secondary electrons emitted from said target by said striking.

20. A source of neutrons for radioactivity well logging that comprises a housing containing deuterium gas at a static low pressure, means for accelerating electrons within said confined deuterium gas to ionize said confined deuterium gas, high voltage means for accelerating the resultant deuterium ions against a tritium target to produce 14 mev. neutrons, and means for pulsing said high voltage means.

References Cited in the file of this patent

UNITED STATES PATENTS

| Number | Name | Date |
|---|---|---|
| 2,161,985 | Szilard | June 13, 1939 |
| 2,275,748 | Fearon | Mar. 10, 1942 |
| 2,489,436 | Salisbury | Nov. 29, 1949 |

FOREIGN PATENTS

| Number | Country | Date |
|---|---|---|
| 495,617 | Great Britain | Nov. 16, 1938 |

OTHER REFERENCES

Introductory Nuclear Physics, by David Halliday; John Wiley & Sons, Inc., New York, N. Y., copyright 1950, pp. 219–221.